J. L. CHESSER.
FISH HOOK.
APPLICATION FILED MAR. 2, 1909.
929,914.
Patented Aug. 3, 1909.
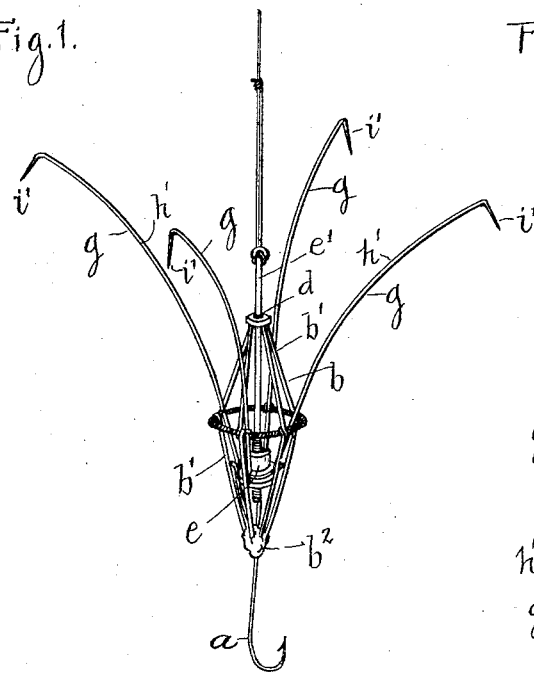
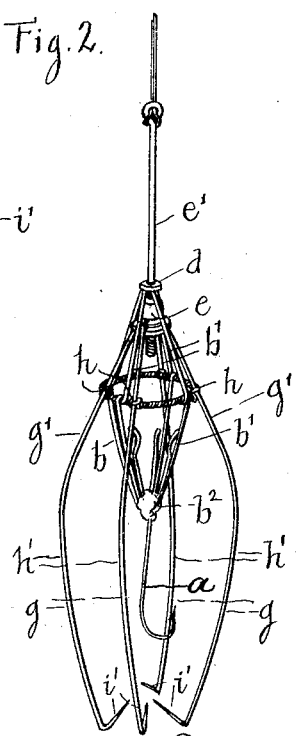
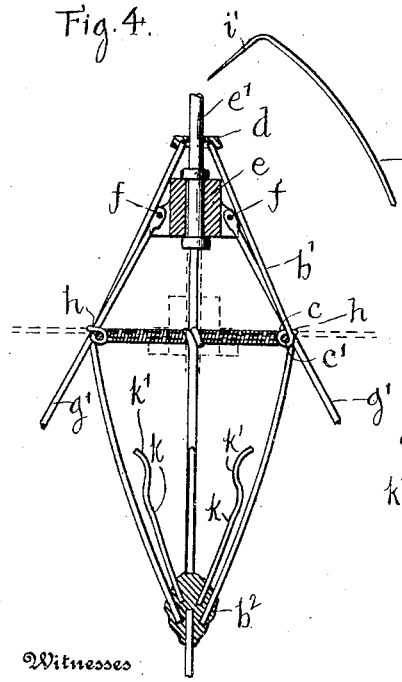
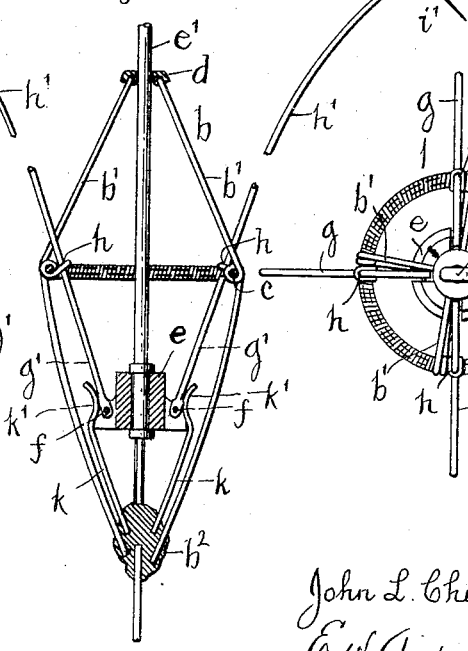
Witnesses
Stuart Hilder.
George M. Anderson.
Inventor
John L. Chesser,
E. W. Anderson.
his Attorney

UNITED STATES PATENT OFFICE.

JOHN L. CHESSER, OF GAINESVILLE, FLORIDA.

FISH-HOOK.

No. 929,914.  Specification of Letters Patent.  Patented Aug. 3, 1909.

Application filed March 2, 1909. Serial No. 480,995.

*To all whom it may concern:*

Be it known that I, JOHN L. CHESSER, a citizen of the United States, resident of Gainesville, in the county of Alachua and State of Florida, have made a certain new and useful Invention in Fish-Hooks; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a perspective view of the invention with the grab hooks raised. Fig. 2 is a similar view with the grab hooks in lower position. Fig. 3 is a central longitudinal section of the invention with the grab hooks raised and parts broken away. Fig. 4 is a similar view with the grab hooks in lower position. Fig. 5 is a plan view of the invention.

The invention relates to fish hooks, having for its object the provision of a strong, simple and durable hook which is designed to render sure the catching of any fish or marine animal, large or small, that will bite or take the bait.

Other objects and advantages will hereinafter appear.

In the accompanying drawings, illustrating the invention, the letter $a$, designates the fish hook proper or bait hook, secured at its upper end to a skeleton-form body $b$, composed of longitudinal rods $b'$, $b'$, converging downward toward the hook, the lower ends of said rods and the upper end of the hook being secured together by any suitable means, such as solder as shown at $b^2$. The rods $b'$, $b'$, have eyes $c$, $c$, formed therein intermediately of their length, a wire ring $c'$, engaging said eyes and serving to hold the rods expanded. These rods at their upper end portions above the ring $c'$, also converge, being soldered or connected together at the upper ends by means of an eye $d$, having its orifice in line with the axis of the skeleton body.

Working within the skeleton body is a head $e$, carried by a rod $e'$, having reciprocatory movement in the eye $d$, said head having pivoted thereto at $f$, $f$, the inner ends of grab hooks $g$, $g$, four in number as shown. These hooks have straight inner end portions $g'$, $g'$, which have sliding bearings in eyes $h$, $h$, of the intermediate wire ring $c'$. The outer end portions $h'$, $h'$, of the grab hooks are curved and are provided with straight inturned pointed free ends $i'$, $i'$. The grab hooks are levers working in converging planes, which planes are vertical when the hook hangs vertically, as it usually does. The grab hook levers have sliding fulcrum bearings in the eyes $h$, $h$, at the inner straight portions thereof near their inner ends, the movement of the grab hooks being controlled by movement of the head $e$, and rod $e'$, to which the line is secured, with relation to the body $b$ or vice versa.

In setting the device when the head is moved downward within the body the grab hooks have a reverse or upward movement, the straight portions thereof being horizontal when the head is in horizontal alinement with the ring $c$, and the fulcrum bearings thereof. Upon continued downward movement of the head the hooks are moved upward beyond the horizontal until the straight inner portions thereof assume at the limit of the downward movement of the head a low acute angular relation to the reciprocatory rod $e'$. At the lower end of its stroke the head $e$, is engaged with upward extending diverging spring arms $k$, $k$, which have inturned shouldered upper ends as shown at $k'$, $k'$. The head will thus spring past such shouldered upper ends of the spring arms and be held securely in lowered position, as will also the grab hooks in raised position.

The raised position is the normal position of the grab hooks, which are held securely far above the bait hook, out of the way. When the bait is taken by the fish a tug is given the bait hook and the body or carrier, which is slid downward upon the rod $e'$, carried by the line. This downward movement of the body has the effect of springing the head $e$, out of engagement with the shouldered upper ends of the arms $k$, $k$, when, upon continued downward movement of the carrier or body, the grab hooks will strike downward until the inturned pointed lower ends almost meet below the bait hook in the head of the fish, effectually disabling or killing it. The skeleton-form body of the hook and the grab hooks with the springs and rod $e'$, are all formed of slender wires set so far apart as to be inconspicuous, the grab hooks being held normally raised and widely separated, out of the way. Inasmuch as the straight inner end portions of the grab hooks assume a low acute angular relation at the end portion of their downward stroke to the axis of the body $b$, or to the rod $e'$, movement of the head $e$, which is greater during this portion of the stroke compared to the inward movement of the hooks than at any other part of the effective stroke, resulting in increased leverage, will cause the hooks to be powerfully drawn together into the head of the fish.

My fish hook may be used to advantage in any place where a fish hook is used, the size being varied to suit the particular case.

In use, when the fish tugs upon the line, the downward stroke of the grab hook is resisted by the spring arms having engagement with the head $e$. The tug of the fish will thus cause a sudden release of the grab hooks when the head springs past such arms, the hooks striking downward into the head of the fish almost instantaneously, owing to the force accumulated in effecting such release. The resistance of the spring arms may be graded for the special case, so that the grab hooks may be more easily released, or vice versa. In case a fish is insecurely hooked, as often happens, the tug of the fish will be sufficient to release the grab hooks and cause them to strike, when it cannot escape.

Having thus described my invention, what I claim as new and desire to secure by Letters Patent is:

1. A fish hook having a bait hook member provided with a bearing piece of open character, and a grab hook member having sliding engagement with the bait hook member and provided with a grab hook lever having a pivotal inner end, and a sliding fulcrum intermediately of its length upon said bearing piece, said pivoted inner end of the lever being capable of movement within the open bearing piece above and below the same.

2. A fish hook comprising a bait hook member, a grab hook member having sliding engagement therewith, and provided with a grab hook lever pivoted at its inner end having a fulcrum bearing intermediately thereof upon the bait hook member and an approximately straight right-angle pointed outer end, the grab hook lever in one position thereof extending outward and upward and having its end pivot located below its fulcrum.

3. A fish hook, comprising a bait hook member having at its lower end the bait hook, at its upper end an eye and intermediately thereof a bearing piece, a grab hook member having a rod slidably engaging said eye and adapted for line connection, and a grab hook lever pivoted thereto and having a fulcrum bearing upon said bearing piece.

4. A fish hook, comprising a bait hook member having at its lower end the bait hook, at its upper end an eye and intermediately thereof a bearing piece, a grab hook member having a head movable above and below said bearing piece, a rod slidably engaging said eye and adapted for line connection, and a grab hook lever pivoted to said head and having a fulcrum bearing upon said bearing piece.

5. A fish hook, comprising a bait hook member having at its lower end the bait hook, at its upper end an eye and intermediately thereof a bearing piece, a grab hook member having a head, a rod slidably engaging said eye and adapted for line connection, and a grab hook lever pivoted to said head and having a fulcrum bearing upon said bearing piece, said bait hook member having a spring catch for retaining the grab hook lever in raised position.

6. A fish hook, comprising a bait hook, a skeleton-form carrier therefor having longitudinal rods, an eye at the upper end thereof and a bearing piece intermediately of said eye and the bait hook, a head working in said carrier and having a rod connection engaging said eye and adapted for line attachment, and grab hook levers pivoted to said head and having sliding fulcrum bearings upon said bearing piece.

7. A fish hook, comprising a bait hook, a skeleton-form carrier therefor having longitudinal rods, an eye at the upper end thereof and a bearing piece intermediately of said eye and the bait hook, a head working in said carrier and having a rod connection engaging said eye and adapted for line attachment, and grab hook levers pivoted to said head and having sliding fulcrum bearings upon said bearing piece, said carrier having spring catches for retaining the grab hook levers in raised position.

8. A fish hook, comprising a bait hook, a skeleton-form carrier therefor, consisting of bowed longitudinal rods connected at the upper and lower ends thereof and having a ring connection intermediately of the lengths thereof, a reciprocatory head working in said carrier and having a rod connection adapted for line attachment and working in a bearing at the upper end of said carrier, and grab hook levers pivoted to said head and having sliding fulcrum bearings upon said ring.

In testimony whereof I affix my signature, in presence of two witnesses.

JOHN L. CHESSER.

Witnesses:
  Z. T. TOUSEY,
  J. F. WOODBERY.